March 28, 1967  P. A. MARCHANT  3,311,248

INSULATED JAR

Filed Nov. 18, 1964

INVENTOR.
PAUL A. MARCHANT
BY Harold P. Beck
ATTORNEY

United States Patent Office 3,311,248
Patented Mar. 28, 1967

3,311,248
INSULATED JAR
Paul A. Marchant, Kansas City, Mo., assignor to Rexall Drug and Chemical Company, Los Angeles, Calif., a corporation of Delaware
Filed Nov. 18, 1964, Ser. No. 412,169
1 Claim. (Cl. 215—13)

This invention relates to an insulated jar adapted for packaging cremes, salves and similar paste-like products and is provided with an insulating chamber construction effective to retard the action of exterior heat and cold on the contents of the jar. Further, many of the plastic materials presently in use for containers of this type permit transmission of quantities of the ingredients of the jar contents through the walls of the plastic container. The transmitted ingredient normally is an oily substance. This frequently results in the outer surface on the container being covered with an oily film which is unsightly and often damaging to the decoration thereon. The insulated jar of the present invention minimizes the possibility of transmission of the ingredient (particularly oil) to the outer surface of the container by providing an insulating chamber around the jar shell housing the contents.

This invention also provides an insulated jar which is provided with an external shell variable in configuration since it is blow molded, and a constant volume inner shell (injection molded to maintain dimensions) which provides a consistent package appearance after filling.

The insulated jar according to the present invention is light weight, resilient and unbreakable and is preferably fabricated from the well-known polyolefin materials such as polyethylene and polypropylene as well as materials of the vinyl group.

The drawings illustrate the present preferred embodiment of the invention in which.

Figure 1:
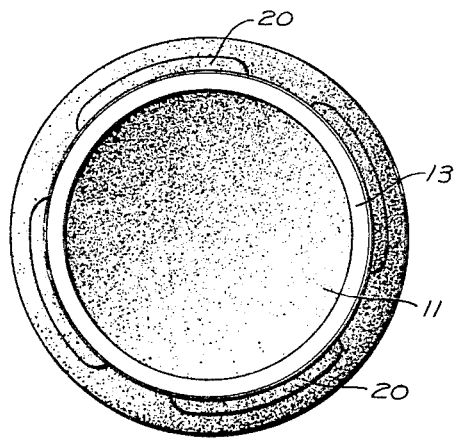
FIG. 1 is a top plan view of the jar with the cover removed.
Figure 3:
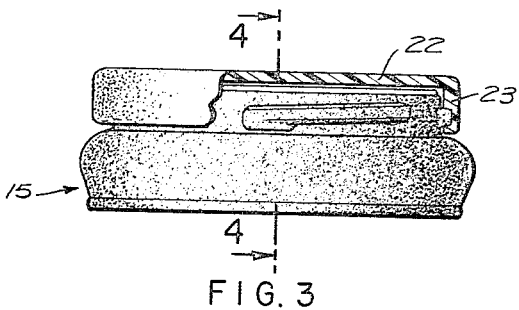
FIG. 3 is an assembled view of the jar partly in cross section.

Briefly, the present invention is directed to an insulated jar assembly having nested inner and outer plastic shells of which the outer shell is blow molded and the inner shell is injection molded and a closure member. The outer shell has bottom and side walls with the top having a continuous, inwardly directed flange defining an open top, and the inner shell has side and bottom walls with an open top having an outwardly directed, continuous rim which overlies the flange of the outer shell. Lug means are provided on the outer surface of the inner shell to snap under the flange of the outer shell after insertion of the inner shell into the outer shell. A conventional closure member is detachably assembled to the shell assembly to provide the finished container unit.

Referring to the drawings, the inner shell, generally designated 10, has a bottom wall 11 and at least one continuous side wall 12 forming a cup-shaped configuration. There may be a plurality of side walls on the inner shell if the horizontal cross-section is triangular, square, hexagon, etc. However, preferably the inner shell has a circular horizontal cross-section. The inner shell is injection molded for precise shape and volume control from semi-flexible materials such as regular or linear polyethylene, polyvinylchloride, etc.

The upper edge of the side wall 12 has an integral, outwardly extending flange or rim 13 which is preferably of a certain minimum radial dimension to be defined. Spaced downwardly from the rim 13 on the outer surface of the side wall 12 are a plurality of circumferentially spaced stop or lug means 14. The lug means 14 are preferably equally spaced from each other and located downwardly below the rim 13 a distance equal to the thickness of the flange of the outer shell to be defined hereinafter. The number of lug means 14 is not critical and may be varied, and in the preferred form, is replaced by a continuous ring or the like around the entire periphery of the outer face of the inner shell 10.

The outer shell, generally designated 15, is preferably blow molded in a conventional manner, including a thread finish 16 at the upper end thereof. It is contemplated that the outer shell 15 can be blow molded into any desired shape or design. Thus, many designs of the outer shall may be used with a common inner shell 10 of a given capacity.

The outer shell includes a bottom wall 17 with integral side walls 18, one or more in number, and an open top defined by the inner edge of an inwardly directed top flange 19. The flange 19 extends inwardly into the area between the rim 13 and the lug means 14. The lug means 14 are spaced from the underface of the rim 13 a distance substantially equal to the thickness of the flange 19. The rim 13 substantially overlies the entire extent of the flange 19 in the manner shown in FIG. 4. Thus, the inner shell 10 may be pushed downwardly into the outer shell to be snugly received therein and the lug means 14 snap beneath the flange to the position shown in FIG. 4. Ideally, the inner shell 10 is substantially immovable within the outer shell 15 once it is snapped into nested position. The inner extremity of the flange 19 is snugly received against the outer face of the side wall 12 of the inner shell and tightly gripped between the rim 13 and lug means 14. Thus, the inner shell cannot in the ideal condition, rotate relative to the outer shell.

The inner and outer shells are preferably molded in a rigid or semi-rigid material, preferably material that is not brittle, such as polypropylene, polyethylene, polyvinylchloride, polycarbonate, etc.

The thread finish 16 on the outer shell is preferably of the configuration shown having angularly disposed thread members 20 at spaced locations around the outer face of the shell and a stop 21 on each thread member which limits the amount of rotation of the closure onto the shell.

Figure 4:
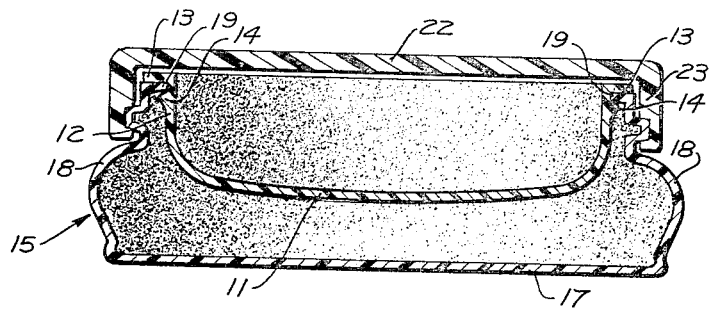
FIG. 4 is an enlarged cross-section taken on line 4—4 of FIG. 3.
Figure 2:
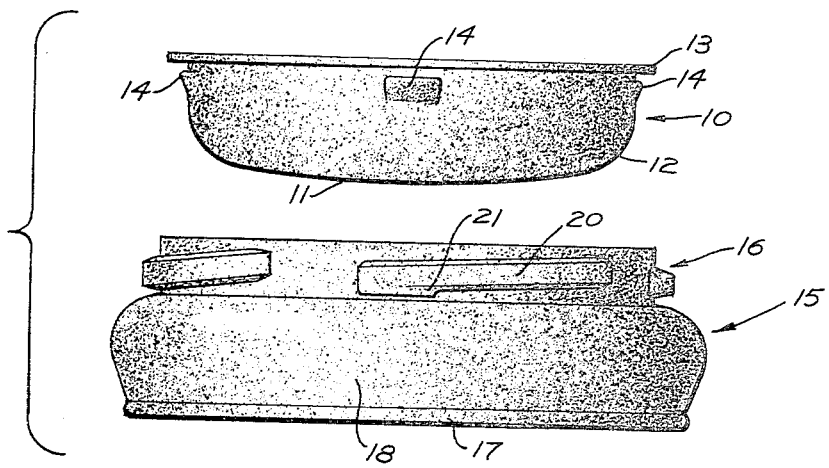
FIG. 2 is an exploded side elevation view of the inner and outer shells of the jar.

The closure is of conventional construction molded from known plastic materials and includes a top wall 22 with a depending continuous peripheral flange 23 being internally threaded to receive the thread members 20 of the shell 15. The closure may be threaded down into engagement with the stops 21 in a conventional rotational manner, and ideally, the under face of the wall 22 engages the upper face of the rim 13 thereby effectively sealing the contents of the jar from the atmosphere. FIG. 4 illustrates the under face of the wall 22 spaced from the rim 13 as a modified form of the assembled jar construction.

The preferred embodiment of the invention has been described herein, however, this preferred embodiment may be modified within the scope of the following claim.

I claim:

An insulated plastic jar assembly having nested outer and inner plastic shells which may be assembled in nested relationship by snapping the inner shell outside the outer shell, said outer shell being blow molded and said inner shell being injection molded; said outer shell having rigid bottom and side walls with a top extremity having a continuous, inwardly directed flange defining an open top; said inner shell having rigid, non-collapsible side and bottom walls and an open top, the inner shell being removably inserted into the open top of the outer shell to a nesting position within the outer shell, the external surface of the side and bottom walls of the inner shell being completely enclosed by the wall of the outer shell when the shells are in nested position and the side walls of the inner and outer shells being spaced from each other along their entire surfaces; and outwardly extending continuous rim integral with the periphery of said open top of the inner shell, said rim extending outward to overlie said continuous, inwardly directed flange on said outer shell when the shells are in nested position; lug means integral with and extending outwardly from the outside surface of the inner shell side walls, said lug means being located a distance below said rim substantially equal to the thickness of the flange on the outer shell, said lug means being snapped into engagement beneath said flange when the shells are assembled into nested position to maintain the inner shell within the outer shell; said flange being in snug engagement with the external surface of the side wall of the inner shell and being tightly gripped between said rim and said lug means to prevent relative rotation between the shells, and a closure comprising a cover portion overlying the open top and rim of the inner shell, with a depending peripheral flange releasibly engagable with the outer surface of the outer shell.

References Cited by the Examiner

UNITED STATES PATENTS

| | | | |
|---|---|---|---|
| 2,594,729 | 4/1952 | Carvalho | 215—6 |
| 2,907,485 | 10/1959 | Lunden | 215—11 |
| 3,129,528 | 4/1964 | Gausewitz | 215—31 |
| 3,156,279 | 11/1964 | Grebowiec et al. | |

JOSEPH R. LECLAIR, *Primary Examiner.*

GEORGE O. RALSTON, *Examiner.*

R. PESHOCK, *Assistant Examiner.*